No. 779,337. PATENTED JAN. 3, 1905.
E. F. WILLIAMS & S. W. DUNCAN.
HORSE RELEASER.
APPLICATION FILED APR. 29, 1904.
2 SHEETS—SHEET 1.
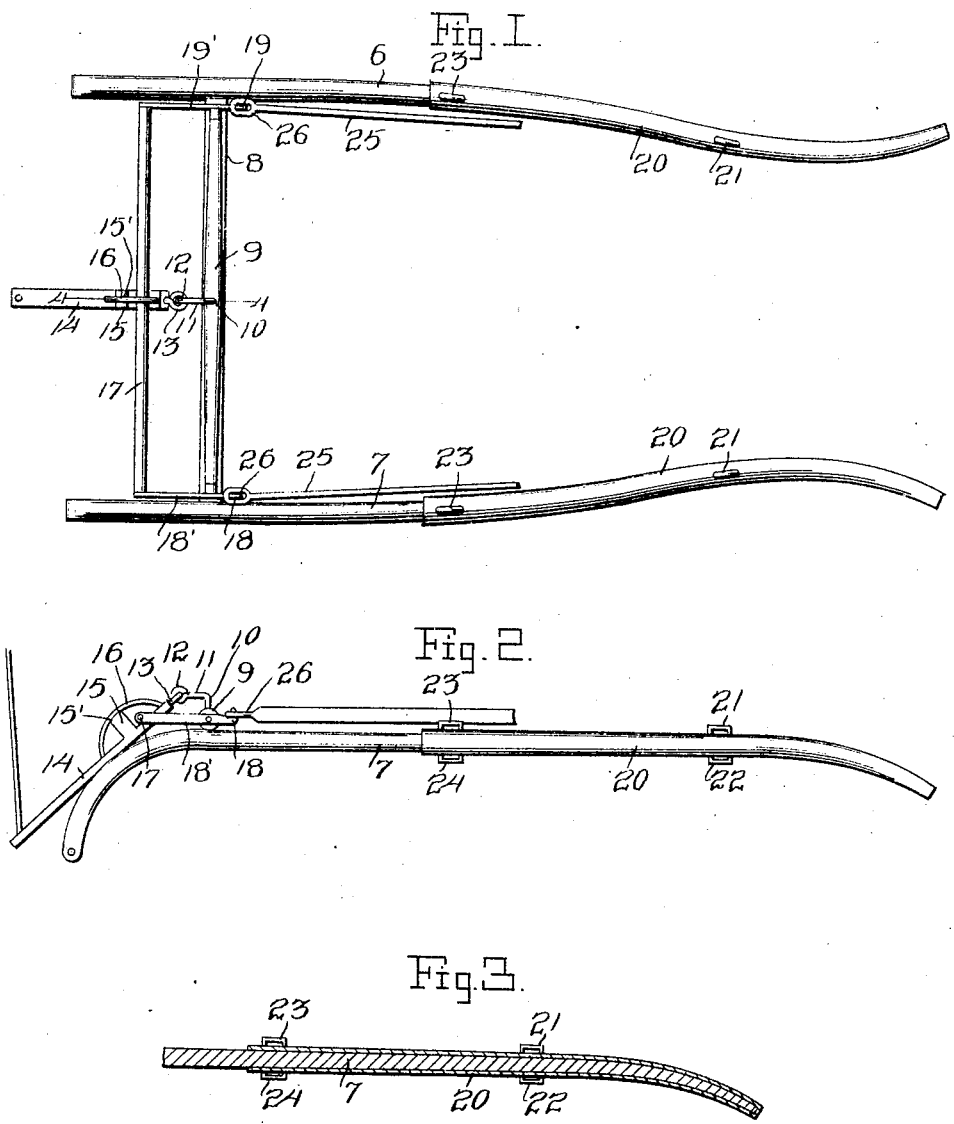
Witnesses
E. K. Reichenbach
F. C. Jones
Inventors
E. F. Williams and
S. W. Duncan
by Chandler & Chandler, Attorneys No. 779,337. PATENTED JAN. 3, 1905.
E. F. WILLIAMS & S. W. DUNCAN.
HORSE RELEASER.
APPLICATION FILED APR. 29, 1904.
2 SHEETS—SHEET 2.
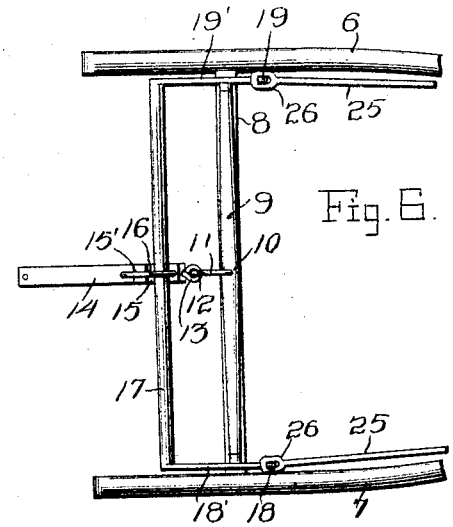
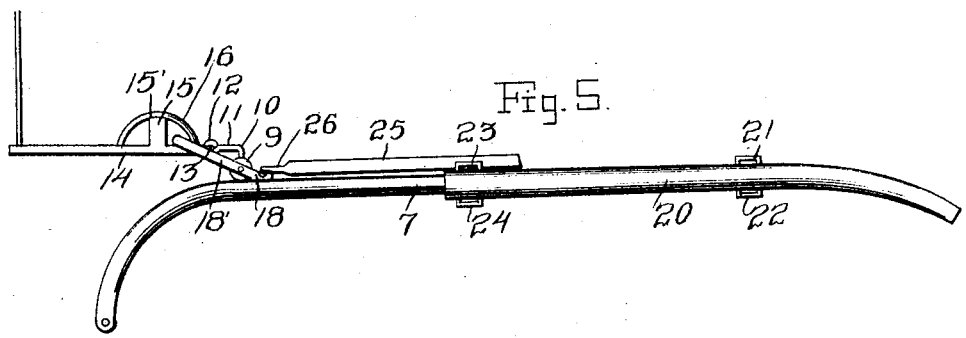
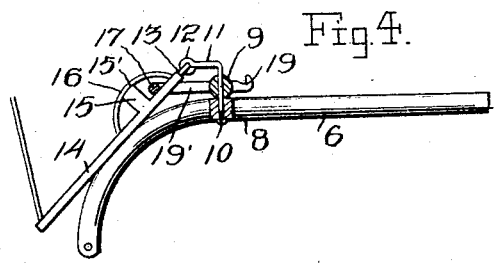

No. 779,337.

Patented January 3, 1905.

UNITED STATES PATENT OFFICE.

SAMUEL W. DUNCAN AND EPHRAIM F. WILLIAMS, OF ST. AUGUSTINE, FLORIDA.

HORSE-RELEASER.

SPECIFICATION forming part of Letters Patent No. 779,337, dated January 3, 1905.

Application filed April 29, 1904. Serial No. 205,503.

*To all whom it may concern:*

Be it known that we, SAMUEL W. DUNCAN and EPHRAIM F. WILLIAMS, citizens of the United States, residing at St. Augustine, in the county of St. John, State of Florida, have invented certain new and useful Improvements in Horse-Releasers; and we do hereby declare the following to be a full, clear, and exact description of the invention, such as will enable others skilled in the art to which it appertains to make and use the same.

This invention relates to vehicles, and more particularly to horse-releasing attachments for use in connection therewith, and has for its object to provide a horse-detacher which may be quickly operated to release a horse from the vehicle and which may be readily attached to any wagon.

In the drawings forming a portion of this specification, and in which like numerals of reference indicate similar parts in the several views, Figure 1 is a top plan view of a wagon having the present invention attached thereto. Fig. 2 is a side elevation of Fig. 1. Fig. 3 is a longitudinal section of one of the shafts and cap. Fig. 4 is a section on line 4 4 of Fig. 1. Fig. 5 is a side elevation of the mechanism in position to release the horse. Fig. 6 is a view of a modification.

Referring now to the drawings, there are shown the shafts 6 and 7, having a cross-brace 8, upon which there is pivotally mounted a whiffletree 9. The pivot-pin 10, which holds the whiffletree in place, extends above the whiffletree and has a rearward extension 11, having an eye 12 at its end with which is engaged a loop 13, secured to the end of a lever 14, which is thus pivotally connected with the extension.

Extending from the upper face of the lever 14 there is a lug 15, and secured to the lever at opposite sides of the lug are the ends of a loop 16, the upper portion of which engages the outer end 15' of the lug. The loop 16 is disposed longitudinally of the lever 14, and beneath it, forwardly of the lug 15, there is disposed a rod 17.

Pivoted to the ends of the whiffletree 9 are hooks 18 and 19, the bills of which extend forwardly and upwardly of the whiffletree, these hooks having shanks 18' and 19', which extend rearwardly and which are secured to the ends of the rod 17. The lever 14 is movable upon its pivot to bring the rod 17 below the point of pivotal movement of the lever, and as this point is located above the pivot-points of the hooks 18 and 19 movement of these hooks through strain upon their bills is prevented, though the lever 14 may be raised to the position shown in Fig. 5, which will move the hooks into the position illustrated.

The shafts 6 and 7 are provided at their outer ends with caps 20, which are loosely engaged therewith and which are provided with loops 21 and 22 at their upper and under sides for the attachment of the back and under bands of the harness, respectively, and at their inner ends the caps 20 are provided with loops 23 and 24 to which the breeching and holdback-straps may be attached.

In the drawings the traces are indicated by the numeral 25, and, as shown, they are provided at their free ends with loops 26, which are engaged with the hooks 18 and 19.

In operation when it is desired to release the animal from the vehicle the lever 14 is raised by means of the cord or strap 14', and this operation moves the hooks 18 and 19 into position to release the loops 26 therefrom, which frees the horse and permits him to leave the shafts, carrying with him the caps 20.

In Fig. 6 there is shown a modification in which the hooks 18 and 19 and rod 17 are formed in one piece.

In practice modifications of the specific construction shown may be made and any suitable materials and proportions may be used for the various parts without departing from the spirit of the invention.

What is claimed is—

1. The combination with a vehicle, of a vertically-extending pin carried thereby, a whiffletree pivotally engaged with the pin, trace-engaging hooks pivoted to the ends of the whiffletree, a lever pivotally connected at one end to the upper end of the vertical pin, said hooks being pivotally connected with the lever, said lever being arranged for movement to bring the point of pivotal connection of the hooks therewith above and below the point of pivotal connection of the lever with the pin.

2. In a horse-releaser, the combination with a whiffletree having a central perforation, of a pin revolubly engaged in the perforation and arranged for connection at its lower end with a vehicle, said pin being turned at right angles above the whiffletree to extend laterally therebeyond, a lever pivotally connected at its forward end with the laterally-turned portion of the pin, trace-engaging hooks pivoted to the ends of the whiffletree and extending rearwardly therebeyond, a loop carried by the lever and a rod connected at its ends with the rearward ends of the hooks and engaged in the loop, said lever being arranged for movement to bring the rod above and below the point of pivotal connection of the lever with the pin.

In testimony whereof we affix our signatures in presence of two witnesses.

SAMUEL W. DUNCAN.
EPHRAIM F. WILLIAMS.

Witnesses:
JAMES E. DUNCAN,
ESTHER O. WILLIAMS.